Figure 1:
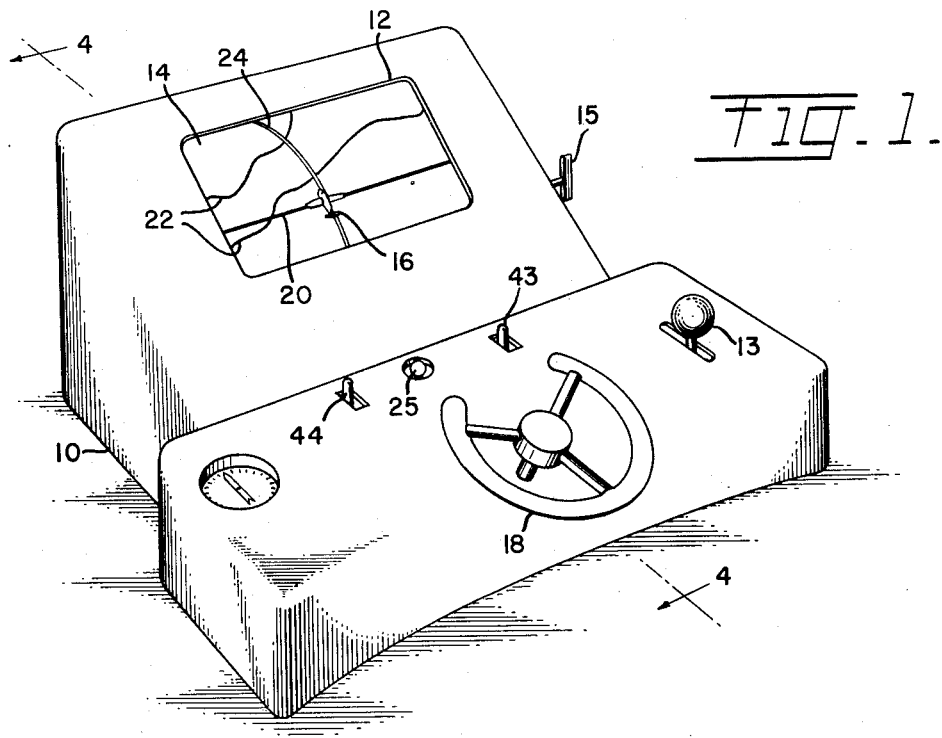

July 5, 1960

S. L. JAVNA ET AL 2,943,855

GAME APPARATUS

Filed March 21, 1956

2 Sheets-Sheet 1

INVENTORS
STEPHEN L. JAVNA
BY EDWARD G. GRIFFITHS
PETER SMALL

James M. Relph.
ATTORNEY

INVENTORS
STEPHEN L. JAVNA
EDWARD G. GRIFFITHS
BY PETER SMALL

James M. Relph.
ATTORNEY

United States Patent Office 2,943,855
Patented July 5, 1960

2,943,855

GAME APPARATUS

Stephen Lewis Javna, Tenafly, Edward George Griffiths, Maywood, and Peter Small, Teaneck, N.J., assignors, by mesne assignments, to Stephen Lewis Javna, Tenafly, and Edward George Griffiths, Maywood, N.J.

Filed Mar. 21, 1956, Ser. No. 573,052

3 Claims. (Cl. 273—1)

This invention relates to improvements in electrical switching devices, and particularly to a switching device in which closed contact elements are opened by interposing a nonconductor therebetween. While not limited thereto, the present invention finds particular application in and will be described with special reference to toys embodying a movable endless display.

As an example of the type of toy with which the present invention has particular application, mention may be made of those toys which simulate operation of a conveyance, such as an airplane, automobile, boat or the like. In toys of this type, a panoramic display such as a map is moved continuously past a viewing window. An indicator is provided which the operator can move within the viewing area at right angles to the display movement so as to bring the indicator into registry with certain displayed material at different locations within the viewing area.

In toys of the conveyance type, for example, a winding route may be portrayed which the operator is to follow by suitably shifting the conveyance indicator. In such toys, it adds interest if failure of the operator to keep the indicator in alignment with the route on the moving panoramic surface is immediately indicated by a flashing light, a buzzer or some similar signaling device. This not only makes it easy to "score" errors on the part of the operator, but also allows the operator to test his skill at memorizing the route and following it without watching the route path. Also, if deviations to different sides of the route can be indicated by slightly differing signals, the operator can learn to follow the route by watching or listening for the signals which indicate one deviation or the other and make the proper correction, much in the manner that an aircraft is kept on course when following radio beam signals.

In accordance with the present invention, switching means is provided for such toys and like applications in the form of an endless element having an electrically conductive surface. As used herein and in the appended claims, the term "endless element" is intended to refer to an endless belt, a rotatable drum, a rotatable disc or any similar element providing a continuous surface which is movable to present within a fixed reference area relative to the movable element a recurring surface pattern of distinctive surface areas. In the case of a toy such as is referred to above, for example, the endless element preferably will be the same one on which the panoramic display is printed, and may be in the form of an endless belt with conductive surfacing either on the same side or on the reverse side from the printed display. A contact element touching the conductive surface forms part of a signaling circuit. Again, in the case of the toy, the contact element either will be mechanically coupled to move in continuous registry with the movable indicator, or may itself constitute the movable indicator. A non-conductive material overlies preselected areas of the conductive surface, so that when such an area passes the contact element, the circuit between the contact element and the conductive material will be interrupted. Of course, the arrangement of the areas to be covered with the non-conductive material will depend on the use for which the particular unit is designed. For the conveyance-type toy, the non-conductive portions can be aligned with or may themselves comprise the route depicted on the display side of the belt. Thus, as long as the operator keeps the movable indicator properly centered on the route line, the circuit will be open. Upon deviation from the route line, the circuit will be closed and the signaling device actuated. By using different patterns of non-conductive overlays on opposite sides of the main route line, different indications can be had for each type of deviation.

Figure 2:
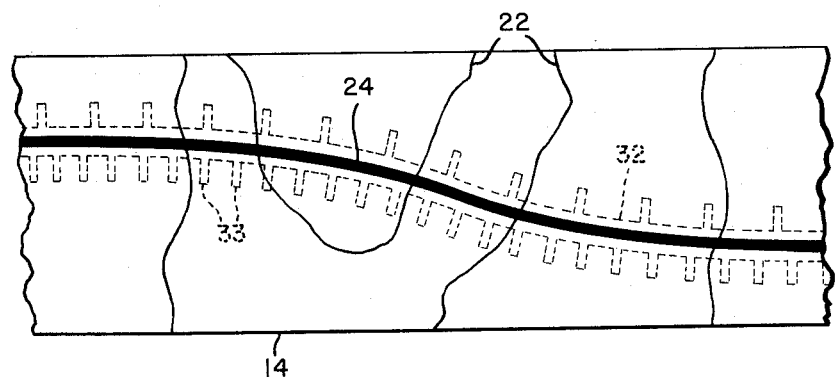
Figure 4:
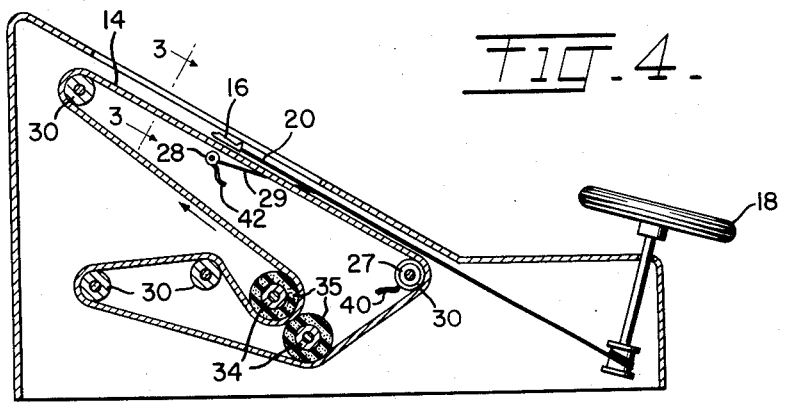
Figure 5:
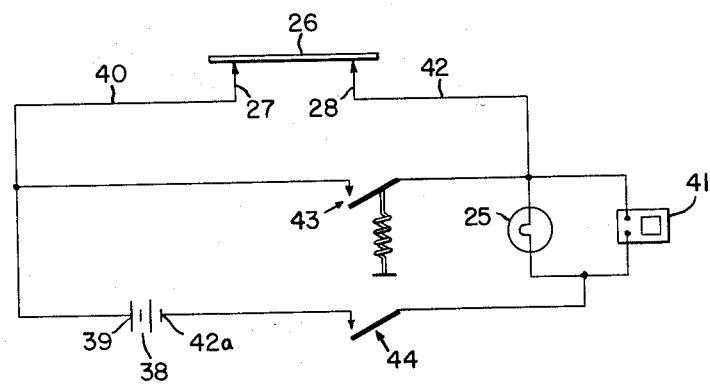
Figure 3:
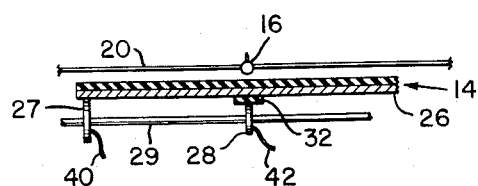

A more complete understanding of the invention and of the various objects and features thereof can be had by reference to the following description of illustrative embodiments thereof, when considered in connection with the accompanying drawings, wherein:

Figure 1 is a perspective view of an airplane flight simulator toy embodying the invention, Figure 2 is a plan view of a flexible belt as used in the toy of Figure 1, with the non-conductive surface areas outlined in dotted lines, Figure 3 is a section view of the belt and associated contact elements, with certain of the parts exaggerated for clarity, taken on the line 3—3 of Figure 4, Figure 4 is a section view of the toy of Figure 1, taken on the line 4—4 of Figure 1, Figure 5 is a schematic diagram of the electric circuit in the toy of Figure 4.

Referring to Figure 1 of the drawing, there is shown a toy embodying the invention in the form of an airplane flight simulator. A housing 10 is provided with a sloping window panel 12 of transparent plastic or the like through which the operator has a view of an imaginary map printed on an endless flexible belt 14 of paper or the like. The belt 14 is moved continuously past the window 12 by a spring motor (not shown) wound by a key 15, and a system of drive rollers such as shown in Figure 4 and described hereinafter. The operator has on-off control of the belt movement by a "throttle" handle 13.

Also visible through the window 12 is an indicator element 16 which may, for example, be shaped like a miniature airplane. The indicator 16 is movable above the belt 14, from side to side of the window 12, by means of a steering wheel 18 connected to the indicator by control cables 20.

In addition to outlines 22 on the map designating land masses, bodies of water and the like, there is also provided a line 24 which extends continuously along the map to indicate a route for the airplane to follow. Thus, as the map moves continuously past the window, the operator must move the airplane from side to side to keep it aligned with the undulating route line 24.

The guiding of the airplane along the route line is made much more exciting and interesting for the operator if some signaling device or devices are used to indicate that the airplane is "off course." For example, a signal light 25 may be provided just below the window display which will light up when the airplane is off course. Alternatively, or in conjunction with the light, an audible signal provided by an electrical buzzer will add further interest, since it permits the operator to simulate "blind flying" conditions, operating the steering mechanism 18 with eyes closed or blindfolded. For even greater realism, it is preferable to have the signaling device or devices give different indications when the airplane is off course on different sides of the route. The provision of means for actuating such a signaling system is one of the principal features of the invention, as will now be described.

In accordance with the invention, the belt 14 on which the map is printed is made an element of an electric circuit, or, more specifically, an element of a switching device in an electric circuit. To this end, as shown in exaggerated form in Figure 3, the undersurface of the belt 14 constitutes an electrically conductive material 26 such as a thin layer of metal foil. As the belt moves forward, this surface 26 continuously touches two contact elements 27, 28. One of the contact elements 27, is fixed in position near the edge of the belt 14 and may, for example, be mounted at the end of one of the guide rollers 30 (Figure 4) over which the belt passes as it moves forward. The other contact element 28 is directly beneath and in exact alignment with the indicator 16 and connected by control cables 29 to the indicator cables 20 leading to the steering wheel 18. Thus, as the operator moves the indicator 16 back and forth, the movable contact element 28 will duplicate the indicator movements, although out of sight beneath the belt 14 as far as the operator is concerned.

As long as both contact elements 27, 28 touch the conductive surface material 26, electrical continuity is afforded from one contact to the other. However, there is provided on preselected portions of the conductive surface 26 a coating of non-conductive material 32, such as an ink that can be readily printed on the conductive surface and that will break the electrical contact between the surface material 26 and the contact element 28. In a device of the type presently being described, the non-conductive coating 32 will be applied along a relatively narrow path congruent with the route path provided on the map surface, as shown in phantom in Figure 2. Thus, as long as the indicator 16 is "on course," in alignment with the route line 24, the contact element 28 will be separated from the conductive surface material 26 by the insulating ink 32, thereby preventing current flow between the two contact elements 27, 28. It should be noted that a narrow strip along the edge of the belt 14 should be kept clear of the non-conductive ink to insure contact at all times between the fixed contact element 27 and the conductive material 26. Alternatively, the fixed contact element 27 may be made as wide as the belt so that it will always touch a conductive portion of the belt surface.

In order to give a signal indicating that the airplane is only slightly off course, and on which side of the route, the non-conductive coating 32 also preferably extends laterally from the main course line in short strips or lines 33 which are given different widths and/or spacings on the opposite sides of the central path. Thus, as the belt 14 moves forward at a substantially uniform rate, the circuit between the contact elements 27, 28 through the conductive material 26 will be interrupted in one characteristic pattern or sequence when the indicator 16 and associated contact 28 are on one side of the course line, and in a different characteristic pattern when the elements 16, 28 are on the other side of the course line. Hence, for deviation to one side of the proper course, the operator will see or hear (depending on the signaling devices used) intermittent signals of a given duration and recurrence rate. For deviation on the other side, the intermittent signals will have a different duration and/or recurrence rate. After some practice, it becomes possible for the operator to keep the airplane on course without watching the indicator 16, merely by differentiating between the two types of off course indications. This, of course, provides the basis for interesting contests between operators to see how many times each permits the airplane to go completely off course (resulting in a steady signal) during a given time interval, for example. Many other similar interesting tests of skill soon suggest themselves to the operators.

In Figure 4 there is shown a typical arrangement of rollers for actuating the belt 14. The belt passes between two roller elements 34 that are provided with resilient surfacing elements 35, such as sponge rubber, to grip the belt 14 securely and drive it forward. One of the rollers 34 will be driven by any suitable motor (not shown), such as the spring-driven wind-up motor previously mentioned. From the drive rollers 34, the belt goes over suitably spaced guide rollers 30 which lead it past the viewing opening 12 and return it to the drive rollers 34 at the proper approach angle and tension for positive drive effect.

In Figure 5 there is shown a typical electrical circuit in which the switching device of the present invention may be used, as in a toy of the type under consideration. The circuit may include a battery 38, one pole 39 of which is connected by a conductor 40 to the fixed-position contact element 27. Any desired signaling device, or devices, such as a buzzer 41 and an electric light 25, may be connected between the other pole 42a of the battery and a conductor 42 leading to the movable contact element 28. If desired, a conventional spring-loaded switch 43 may be provided in shunt with the belt switching device 26—28. This switch 43, operable by the user independently of the moving belt, can be used for "signaling" between two operators each having their own flight simulator toy. This, of course, gives a further element of interest and realism to the device. It is also preferable to have an on-off switch 44 to prevent inadvertent current drain when the toy is not in use.

In the embodiments of the invention described in the foregoing, the areas of pictorial surface which have some particular significance such as the route line 24 in Figure 1 have been represented electrically by non-conductive surface areas. Also, in all cases, it has been assumed that a conductive surface material has been used on some backing material such as paper or the like. It will be apparent, however, that the first-mentioned relationship can readily be reversed so that the areas of special significance (e.g., the route 24) are represented electrically by conductive surface areas surrounded by non-conductive areas. Furthermore, it is evident that the entire element providing the endless conductive surface can be made of conductive material, such as a thin metal disc or the like, and further, that the movable position indicator 16 itself may constitute the movable contact element 28. In such case, the control cables 20 can also serve as connecting conductors, or a separate conductor can be used as is found preferable for any given situation.

It will be understood that the specific application of the switching mechanism described herein as in toys is not the sole use for such mechanism. The movable surface with conductive and non-conductive surface areas can be used wherever a predetermined electric circuit control sequence is needed. In an industrial operation, for example, where it is required to turn various devices on and off in predetermined programming relation or sequence, such mechanism can be used to advantage. Other similar applications undoubtably will suggest themselves readily to those skilled in the art. Among the advantageous features of such a mechanism, mention may be made of the ready interchangeability of different program belts or discs, the very low cost of the parts required and the simplicity of the entire mechanism, all leading to economy of manufacture in a mechanism, which is, at the same time, reliable in operation and with a minimum of parts subject to wear and failure.

What is claimed is:

1. In a toy of the type having an endless, continuously movable element which has on an exposed surface first and second distinctive areas, one of said areas comprising a continuous route line extending in the direction of movement of said element and the other of said areas comprising the remaining portion of said surface, an indicator which is movable laterally with respect to the direction of movement of said element, said movable element having an electrically conductive surface portion which is coextensive with one of said distinctive areas and an electrically non-conductive surface portion which is coextensive with the other of said distinctive areas, an electric signaling circuit including said conductive surface portion, a contact element in said circuit which touches said movable element and which is linked to said indicator to move laterally therewith whereby to close and open said circuit as said contact touches said conductive and non-conductive portions upon alignment and misalignment of said indicator with said route line, said first surface area including lateral extensions of said route line, said lateral extensions being arranged in patterns of spaced, short lines which are of different configuration on opposite sides of said route line whereby to provide different signal sequences upon deviations of said indicator on different sides of said route line.

2. In a device for signaling the relative location of an indicator which is movable laterally with respect to the direction of movement of a continuously movable endless element, in combination, an electrical circuit adapted to be connected to an electrical current source and including means for indicating the flow of current through said circuit, and a switching assembly in series with said means, said assembly comprising an electrically conductive material covering one entire surface of said endless element, a conductive member in continuous electrical contact with said conductive material, a contact element continuously engaging said one surface of said endless element, and a thin layer of electrical insulating material covering a continuous line portion of said conductive material and also covering lateral extensions of said continuous line portion, said lateral extensions being arranged in patterns of spaced, short lines which are of different configuration on opposite sides of said continuous line.

3. In a toy of the type having an endless, continuous movable belt which has on an exposed outer surface a changing panoramic map display with an undulating route line extending through said display in the general direction of movement of said belt, and an indicator which is movable over said exposed belt surface laterally with respect to the direction of belt movement so that said indicator can be brought into or out of alignment with said route line, an electrical switching assembly for opening and closing an electric circuit in accordance with the position of said indicator relative to said route line, said assembly comprising an electrically conductive material covering the undersurface of said belt, a conductive member in continuous electrical contact with said conductive material, a contact element engaging said undersurface of said belt, electrical insulating material covering a portion of said undersurface along a continuous path substantially identical to said route line, said contact element being linked to and movable with said indicator in the same relative position with respect to said path that said indicator has to said route line, whereby to provide an electrical connection between said member and said contact element through said conductive material upon deviation of said indicator from said route line, and interruption of said connection by said insulating material upon alignment of said indicator with said route line, said insulating material also extending laterally from said path in patterns of spaced short lines which are of different configuration on opposite sides of said path, whereby to provide for different sequences of circuit interruption with respect to deviations of said indicator on different sides of said route line.

References Cited in the file of this patent

UNITED STATES PATENTS

| 2,003,852 | Beattie | June 4, 1935 |
| 2,004,591 | Sunskes | June 11, 1935 |
| 2,265,598 | Firestone et al. | Dec. 9, 1941 |
| 2,751,448 | Timken et al. | June 19, 1956 |
| 2,808,263 | Goldfinger | Oct. 1, 1957 |

FOREIGN PATENTS

| 250,610 | Great Britain | Oct. 7, 1926 |
| 368,974 | Great Britain | Mar. 17, 1932 |
| 446,214 | Great Britain | Apr. 27, 1936 |
| 943,567 | France | Oct. 4, 1948 |